United States Patent
Lin

Patent Number: 5,950,053
Date of Patent: Sep. 7, 1999

[54] ILLUMINATION COMPENSATION DEVICE OF SCANNER

[76] Inventor: Bob Lin, No. 9, Lane 102,San-Min Rd., Taipei, Taiwan

[21] Appl. No.: 09/097,805

[22] Filed: Jun. 16, 1998

Related U.S. Application Data

[63] Continuation-in-part of application No. 08/790,616, Jan. 29, 1997, Pat. No. 5,768,663.

[51] Int. Cl.$^6$ .............................. G03G 15/04; F21S 3/00
[52] U.S. Cl. ........................ 399/220; 358/509; 362/217
[58] Field of Search ........................... 399/220; 362/217, 362/225; 358/480, 509

[56] References Cited

U.S. PATENT DOCUMENTS

| | | | |
|---|---|---|---|
| 3,498,708 | 3/1970 | Howard | 399/220 |
| 3,779,640 | 12/1973 | Kidd | 399/220 |
| 4,549,251 | 10/1985 | Chapman et al. | 362/217 X |
| 4,767,193 | 8/1988 | Ota et al. | 362/217 X |
| 5,479,328 | 12/1995 | Lee et al. | 362/217 X |
| 5,765,944 | 6/1998 | Fallon et al. | 362/217 X |
| 5,768,663 | 6/1998 | Lin | 399/220 |

*Primary Examiner*—Fred L Braun
*Attorney, Agent, or Firm*—Bacon & Thomas

[57] ABSTRACT

An illumination compensation device of a scanner for balancing the light intensity on the optic-electric sensor of the scanner and facilitating the connection of the power wires and power supply. The device includes at least one curved light source having a curved middle portion and two bent ends whereby the light intensity on a whole optic-electric sensor can transfer images to electric signals without distortion, and the scanning quality is upgraded. In addition, both bent ends of the curved light source of the invention can facilitate the connection of its power wires and power supply.

2 Claims, 4 Drawing Sheets

ILLUMINATION COMPENSATION DEVICE OF SCANNER

CROSS-REFERENCE TO RELATED APPLICATION

The present invention is a continuation-in-part of patent application Ser. No. 08/790,616, filed on Jan. 29th, 1997, and now U.S. Pat. No. 5,768,663.

BACKGROUND OF THE INVENTION

This invention relates to an illumination compensation device of a scanner for balancing the light intensity on every pixel of the optic-electric image sensor of the scanner to provide higher scanning quality.

Optic-electric image sensors, such as CCD (Charge-Coupled Device) and CIS (Contact Image Sensor), possess the capability transferring light intensity to electric signal. Hence, they have been broadly used in many fields. Scanner and fax machines are the known cases. In the U.S. Pat. No. 5,115,374, a build-in scanner of a computer was disclosed. The conventional light source of a scanner is a straight cylindrical lamp tube. The illumination at the middle portion of the conventional light source is always higher than that at both ends. Hence, when a picture or document sheet is scanned, the unbalanced illumination of the conventional light source causes the scanned image to be distorted and dimmed at its margins. In order to resolve the above problem of a scanner, one disclosed method provides elongating the lamp tube of the scanner. This method can not efficiently resolve the above problems, and the size of the scanner is also enlarged.

In the U.S. Pat. No. 08/768,663 of the applicants, an illumination compensation device of a scanner had been provided to resolve the above problems of a scanner. The illumination compensation device includes at least one bent light source, where the bent light source is a cylindrical lamp tube with a straight middle portion and two bent ends. The bent light source can balance the illumination on the whole scanning line without elongating its width. However, unequal light intensity is caused on the optic-electric sensor of the scanner of the prior art. It is noted that, with the same illumination on the object plane of a lens, the light intensity at the margin of the image plane of the lens is smaller than the image plane's middle portion. Although the scanning quality of a scanner with the bent light source is better than that with the elongated light source described above, the straight middle portion of the bent light source of the prior art still causes non-uniform light intensity on the scanning line.

Besides, in order to prevent the power wires of the light source disturbing the scanning operation of the scanner, the power wires are usually together connected to the power supply from one side of the light source. Since the power wires of the bent light source of the prior art, as shown in FIG. 1 and FIG. 2, are needed to be bent at a large angle or multiple times, the power wires are easily damaged.

SUMMARY OF THE INVENTION

The major objective of the invention is to provide an illumination compensation device with a curved light source of a scanner for balancing the light intensity on the optic-electric sensor and facilitating the connection of the power wires and power supply.

With the problem of the prior art in mind, the illumination compensation device of the invention includes at least one curved light source, where the curved light source has a curved middle portion and two bent ends. With the curved light source of the illumination compensation device of the invention, the light intensity on the whole scanning line is uniform. Consequently, the optic-electric sensor of the scanner of the invention can transfer images to electric signals without distortion. In addition, both bent ends of the curved light source of the invention can facilitate the connection of its power wires and power supply.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE PREFERRED EMBODIMENTS

The illumination compensation device of a scanner of the invention includes at least one light source. Bright light generated by the light source is projected to a document sheet being scanned, and the reflected light, i.e. the image of the document sheet, from the document sheet is then focused into the optic-electric sensor of the scanner of the invention through a lens. The image of the object is consequently transferred into electric signals by the optic-electric sensor. The electric signals are finally transferred to digital information.

Figure 1:
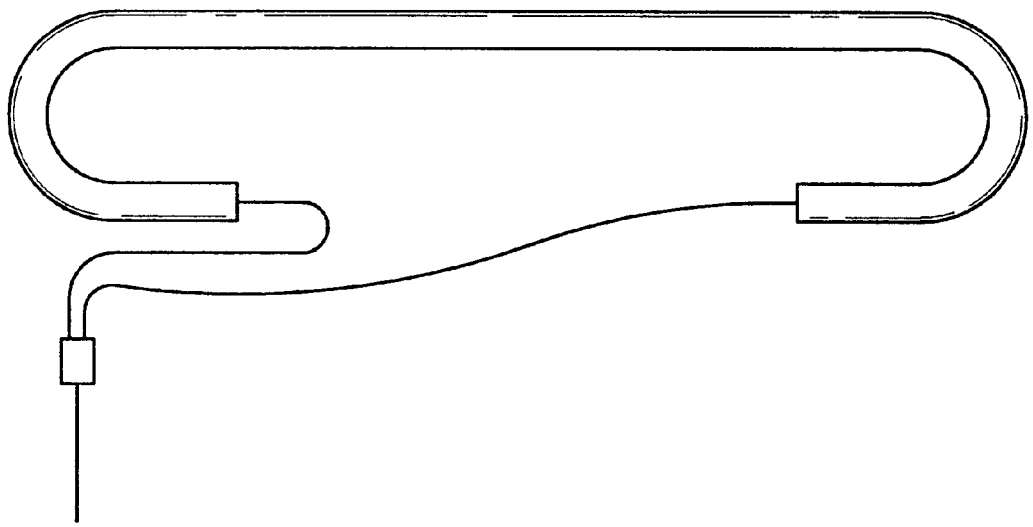
FIG. 1 is the connection diagram of a light source of the prior art and its power wires.
Figure 2:
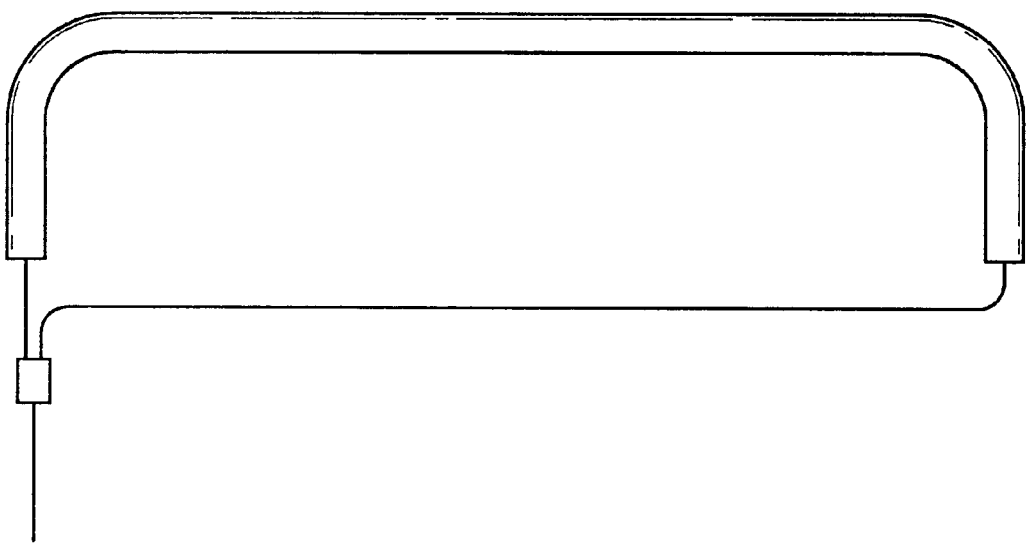
FIG. 2 is the connection diagram of another light source of the prior art and its power wires.
Figure 3:
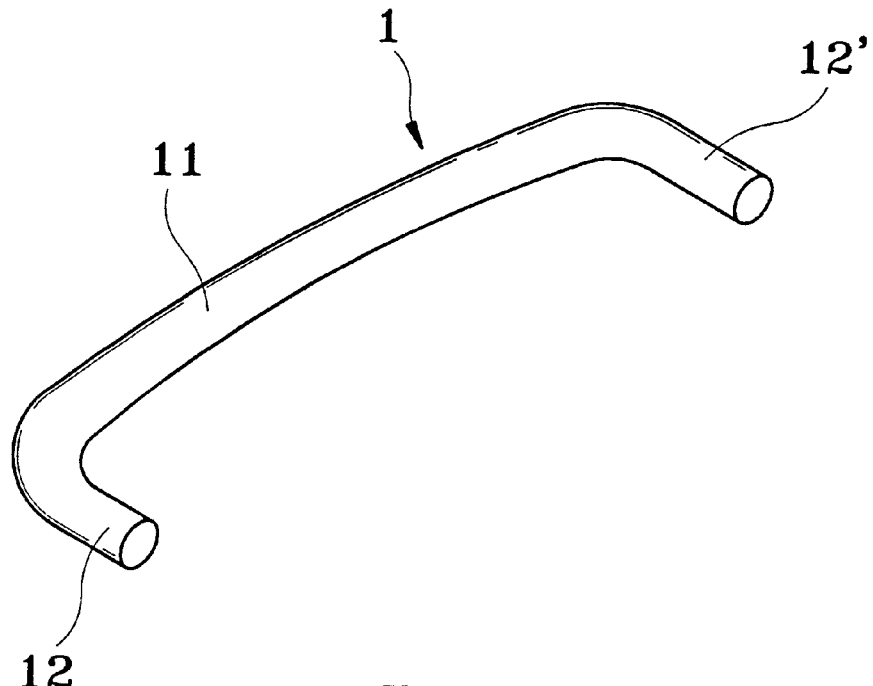
FIG. 3 is the perspective view of a preferred embodiment of the light source according to the invention.
Figure 4:
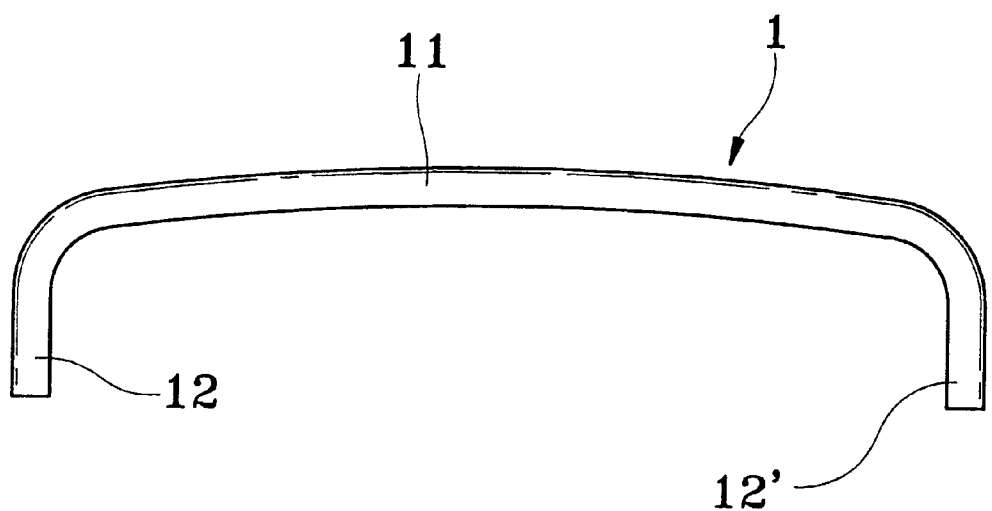
FIG. 4 is the top view of the light source of the invention shown in FIG. 3.

Please refer to FIG. 3 and FIG. 4, which respectively show the perspective view and top view of the first preferred embodiment of the light source of the invention. The light source of the first preferred embodiment is a curved cylindrical light tube 1, which includes a curved middle portion 11 and two bent ends 12 and 12'. The scanning region of the optic-electric sensor is a straight line called a scanning line. The scanning line is parallel to the middle portion 11 of the curved cylindrical light tube 1. It is noted that the perpendicular distance between the scanning line and the curved middle portion 11 of the curved cylindrical light tube 1 is largest at the mean point of the scanning line, and the perpendicular distance is gradually decreased from the mean point to both ends of the scanning line. Since the light intensity is inversely proportional to the square of the perpendicular distance between the scanning line and the curved middle portion 11 of the curved cylindrical light tube 1, the light intensity of the scanning line is gradually higher from the mean point to both ends in the scanning line. Hence, the non-uniform light intensity on the optic-electric sensor with the light source of the prior art, caused by the lens, is uniformly compensated by using the light source of the invention. The scanning quality of the invention is consequently upgraded.

Figure 5:
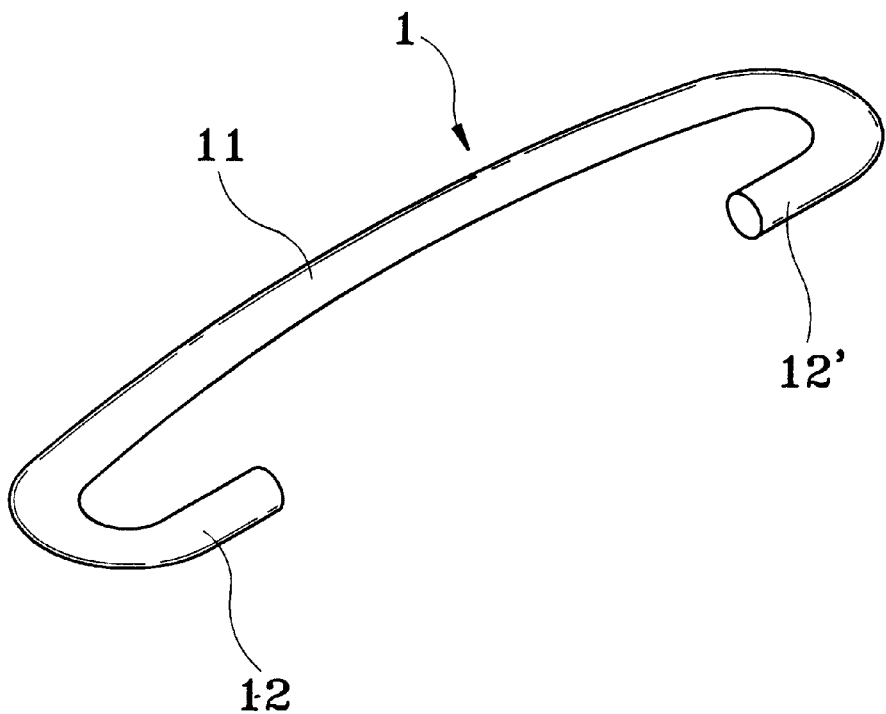
FIG. 5 is the perspective view of another preferred embodiment of the light source according to the invention.

In the first embodiment as shown in FIG. 4, both bent ends 12 and 12' of the curved cylindrical light tube 1 are symmetrically L-shaped FIG. 5 is the second embodiment of the invention, where the light source is a curved cylindrical light tube 1 with a curved middle portion 11 and two symmetrical U-shaped ends 12 and 12'.

Figure 6:
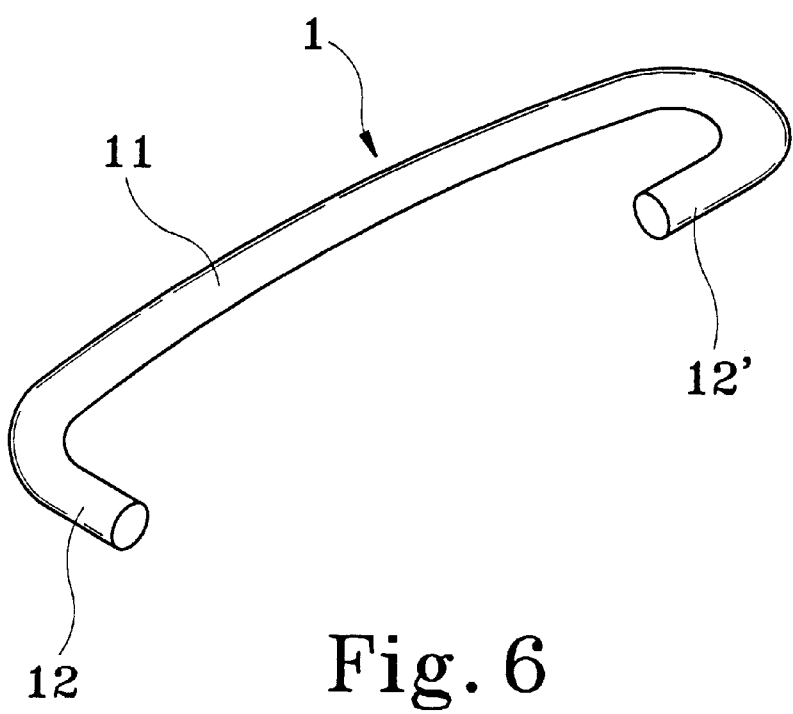
FIG. 6 is the perspective view of a further preferred embodiment of the light source according to the invention.
Figure 7:
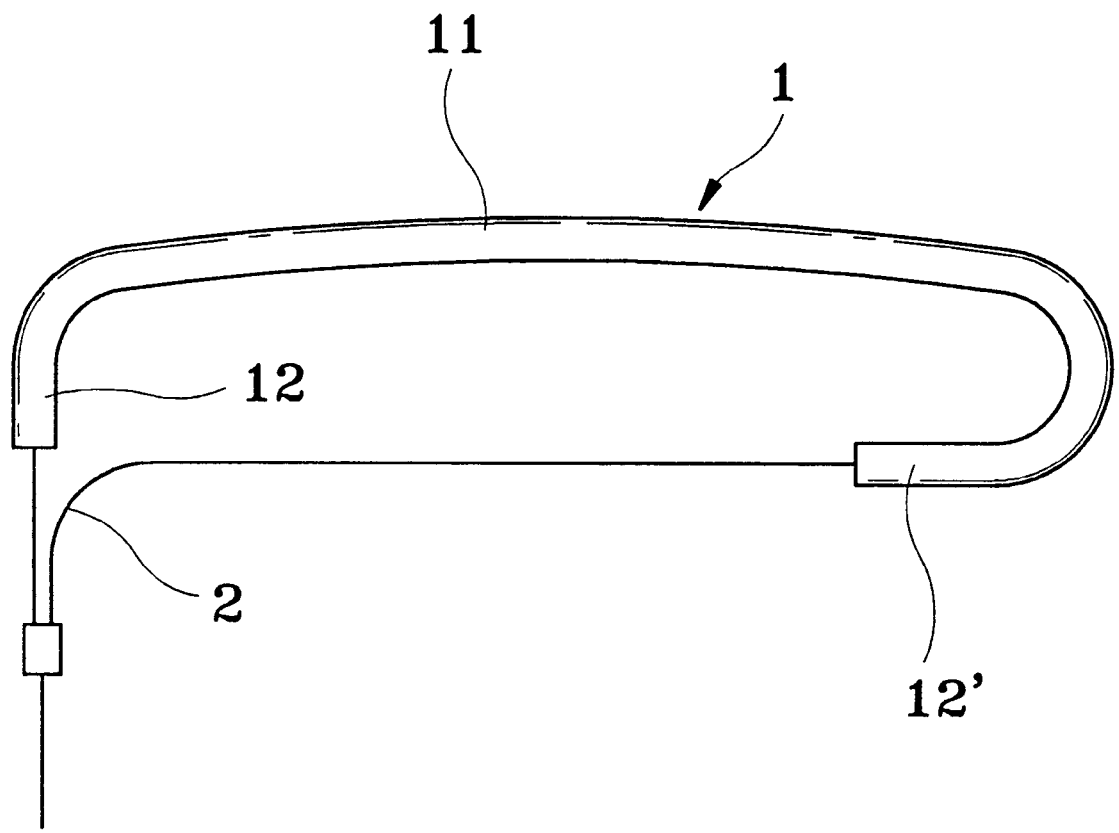
FIG. 7 is the connection diagram of the light source shown in FIG. 6 and its power wires.

FIG. 6 is a further embodiment of the invention, where the light source is a curved cylindrical light tube 1 with a curved middle portion 11 and two bent ends 12 and 12' which are different from the above embodiments. One bent end 12 is L-shaped and the other end 12' is U-shaped. In the three embodiments, although the bent ends of the light sources have different shapes, the middle portions of the light sources are curved. The light intensity on the optic-electric sensor in every embodiment is uniformly compensated. In addition, the structure of the light source in the last embodiment, as shown in FIG. 6, facilitates the connection of the power wires of the light source and the power supply without large-angle bending of the power wires. FIG. 7 is the connection diagram of the light source shown in FIG. 6 and its power wires.

It is noted that the illumination compensation devices described above are the preferred embodiments of the present invention for the purposes of illustration only, and are not intended as a definition of the limits and scope of the invention disclosed. Any modifications and variations that may be apparent to a person skilled in the art are intended to be included within the scope of the present invention.

What I claim is:

1. An illumination compensation device of a scanner, comprising:

at least one light source, providing bright light, including a curved middle portion and two ends, the two ends being bent asymmetrically inward;

whereby the bright light of said light source projected to a document sheet being scanned, an image of the document sheet being focused to an optic-electric sensor of the scanner through a lens of the scanner with uniform light intensity on said whole optic-electric sensor, and the scanning quality of the scanner are upgraded.

2. The illumination compensation device of a scanner of claim 1, wherein one of said bent ends of said light source is L-shape and the other of said bent ends of said light source is U-shape.

* * * * *